Sept. 21, 1954　　　H. P. SORRELS　　　2,689,446
SIDE DELIVERY RAKE
Filed Dec. 9, 1952　　　3 Sheets-Sheet 2
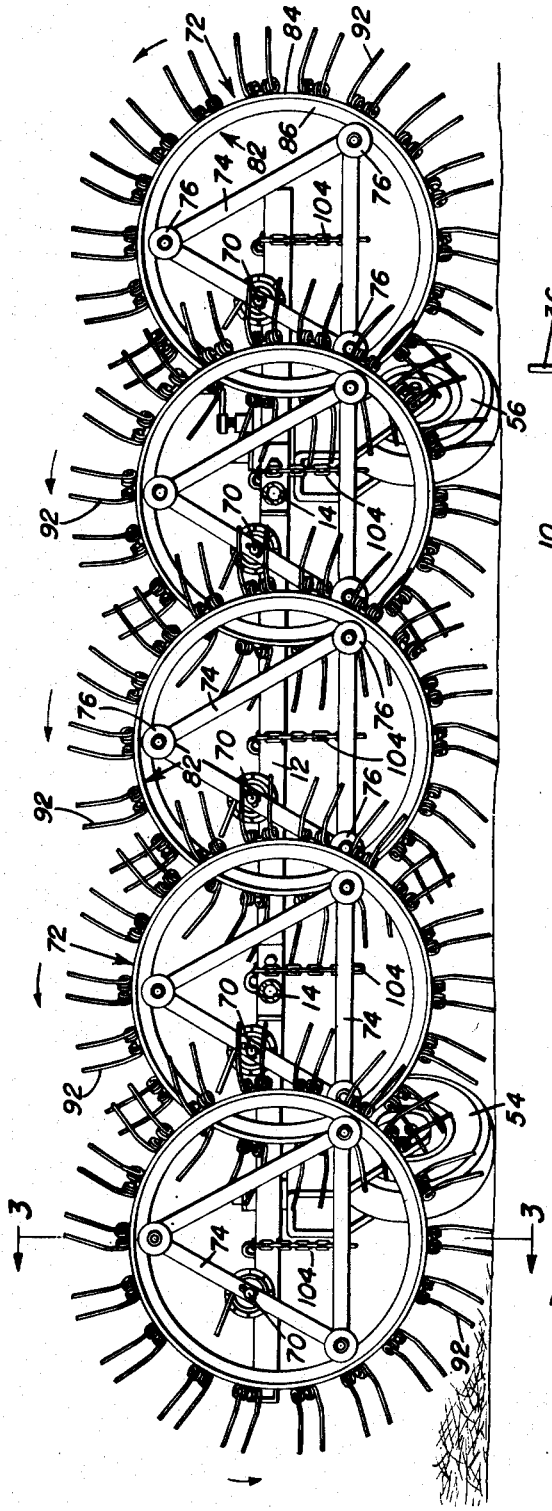
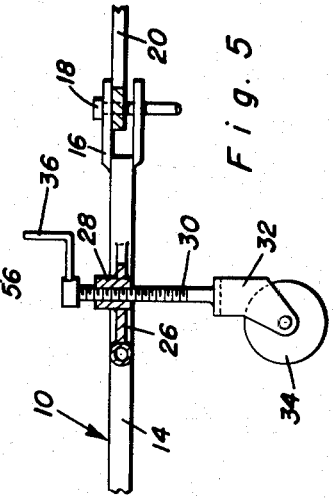
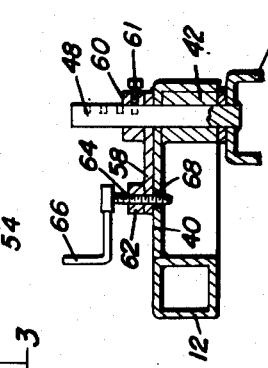
Herman P. Sorrels
INVENTOR.

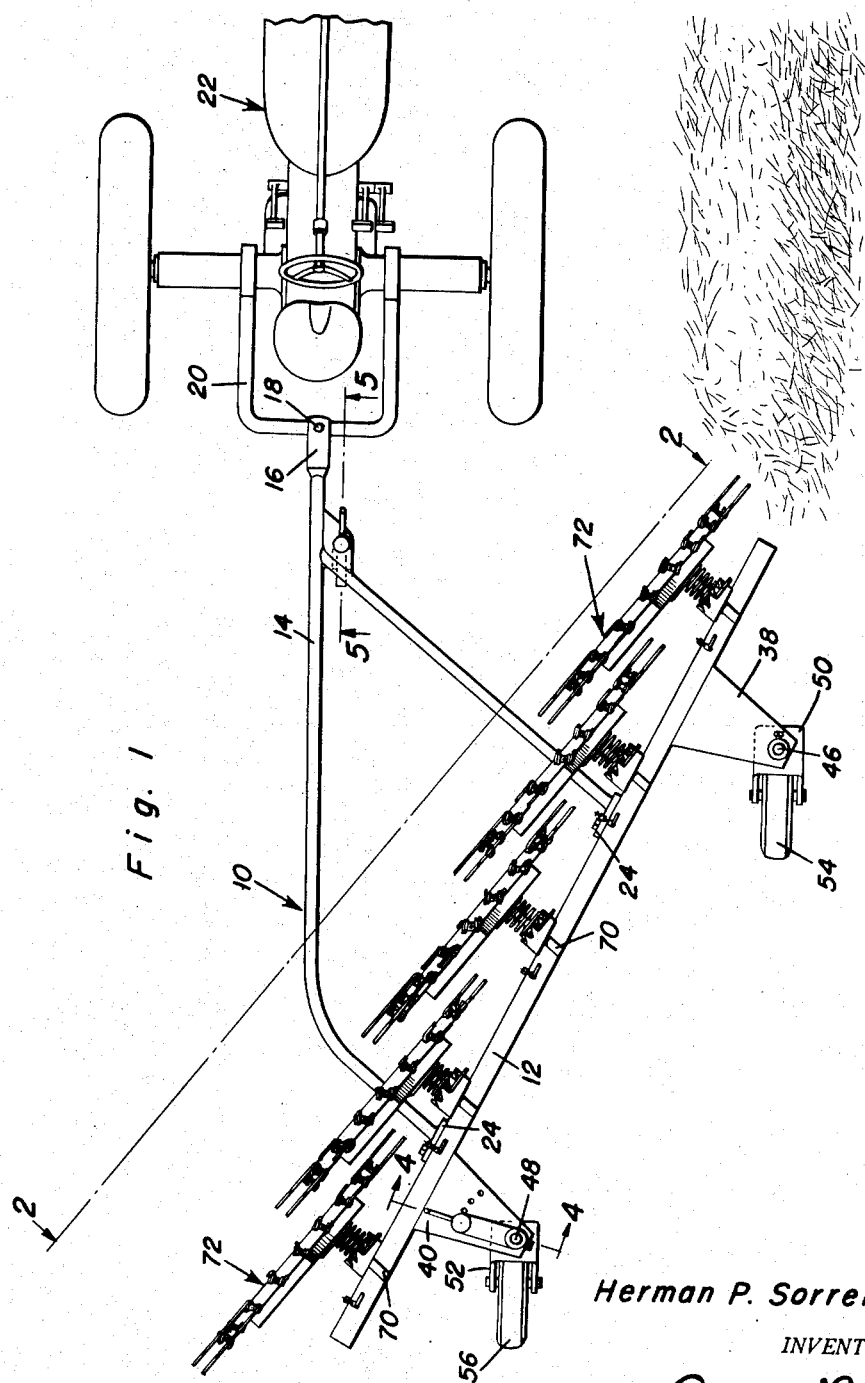
Herman P. Sorrels
INVENTOR.

Sept. 21, 1954     H. P. SORRELS     2,689,446
SIDE DELIVERY RAKE

Filed Dec. 9, 1952     3 Sheets-Sheet 3

Herman P. Sorrels
INVENTOR.

BY *Clarence A. O'Brien*
*and Harvey B. Jacobson*
Attorneys

Patented Sept. 21, 1954

2,689,446

UNITED STATES PATENT OFFICE 2,689,446

SIDE DELIVERY RAKE

Herman P. Sorrels, Tulare, Calif.

Application December 9, 1952, Serial No. 324,977

7 Claims. (Cl. 56—377)

This invention relates to new and useful improvements in tractor drawn rakes and the primary object of the present invention is to provide a side delivery rake including a series of floating, independently rotatable rake members disposed in overlapping relationship so that the members will form a conveyor for depositing mowed hay in a single swath to one side of a tractor towing the rake.

Another important object of the present invention is to provide a side delivery rake involving a plurality of eccentrically pivotally attached rake members that are individually spring-urged into ground engaging position to follow the contour of the ground over which the rake is being moved.

Yet another object of the present invention is to provide a side delivery rake wherein the springs acting on the rake members are adjustable to vary the resilient force of the springs.

A further object of the present invention is to provide a side delivery rake wherein the overlapping rake members each include an isosceles triangular support whose corners carry peripherally grooved rollers that accommodate flanges of tooth-holding rings which will rotate as they engage the ground during movement of the rake.

A still further aim of the present invention is to provide a side delivery rake that is simple and practical in construction, strong and reliable in use, small and compact in structure, efficient and durable in operation, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the invention hitched to a tractor;

Figure 2 is an enlarged vertical sectional view taken substantially on the plane of section line 2—2 of Figure 1;

Figure 4 is an enlarged detail vertical sectional view taken substantially on the plane of section line 4—4 of Figure 1;

Figure 5 is an enlarged detail vertical sectional view taken substantially on the plane of section line 5—5 of Figure 1;

Figure 3:
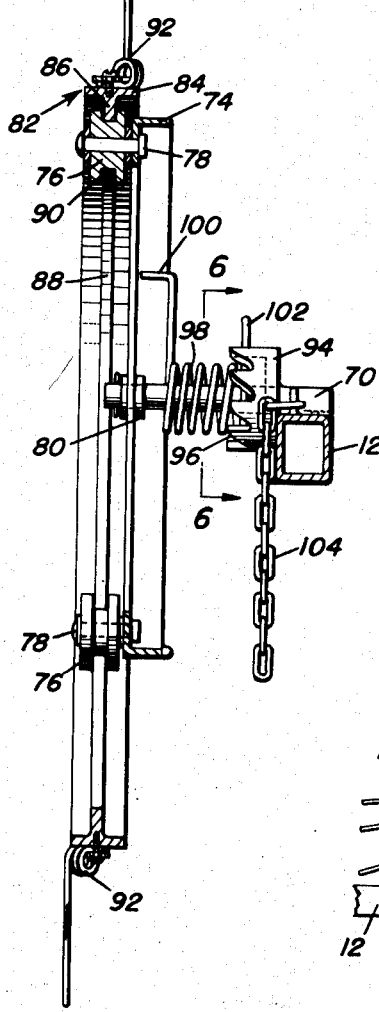
Figure 3 is an enlarged vertical sectional view taken substantially on the plane of section line 3—3 of Figure 2.
Figure 6:
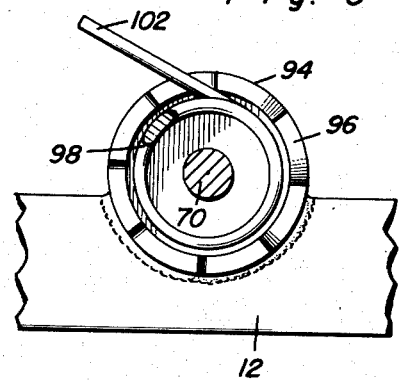
Figure 6 is an enlarged vertical sectional view taken substantially on the plane of section line 6—6 of Figure 3.

Referring now to the drawings in detail wherein for the purpose of illustration, there is disclosed a preferred embodiment of the present invention, the numeral 10 represents a draft frame including a beam 12 and a Y-shaped tongue 14. The forward end of the tongue 14 is provided with a bifurcated portion 16 that is coupled through the medium of a pin 18 to the drawbar 20 of a tractor 22. The rear ends of the tongue 14 are provided with mounting flanges 24 that are secured to the beam 12.

A plate 26 is secured to the tongue 14 near the fork in the tongue. This plate fixedly supports an internally threaded vertical sleeve 28 that receivably engages a screw rod 30. A U-shaped bracket 32 is fixed to the lower end of rod 30 and supports a prop wheel 34. A crank handle 36 is suitably secured to the upper end of rod 30 and provides means whereby the wheel 34 may be raised or lowered.

Rearwardly extending horizontal plates or arms 38 and 40 are fixed as by welding or the like to the ends of the beam 12. The plates 38 and 40 support identical vertical bearings 42 for wheel holding shafts 46 and 48, one of which bearings 42 is shown in Figure 4. Yokes 50 and 52 are fixed to the lower ends of the shafts 46 and 48, and carry ground wheels 54 and 56. Wheel 54 constitutes the leading wheel of frame 10 and a caster whereas the wheel 56 forms a direction wheel and the trailing wheel of the frame 10.

Means is provided for locking the shaft 48 in a selected rotated position so that the beam 12 may be retained at a predetermined inclined angle relative to the direction the tractor 22 is moving. This means comprises an arm 58 having an end sleeve portion 60 suitably secured thereto that is secured over the upper end of shaft 48 by a set screw 61. The other end portion of arm 58 fixedly supports a nut 62 that receivably engages a screw 64 having a hand grip 66 secured to its upper end. Plate 40 underlies arm 58 and is provided with a series of spaced apertures 68 for selectively receiving screw 64 to lock shaft 48 in a selected rotated position.

A plurality of longitudinally spaced, parallel shafts or rods 70 are fixed to and extend forwardly from the beam 12 to rotatably support rake members 72. Each rake member 72 includes an open, isosceles, angle iron support or frame member 74 having peripherally grooved rollers 76 secured to its corners by fasteners 78. One angle iron side of each support member 74 is provided with a central bearing 80 for receiving the shafts 70 to eccentrically rotatably secure the members 74 to the beam 12.

The rake members 72 also include rings 82 that are T-shaped in cross-section to include continuous flanges 84 and 86. The inner peripheral edges 88 of the flanges 86 are received in the grooves 90 of the rollers 76 to rotatably secure the rings 82 to the support members 74. A plurality of circumferentially spaced outwardly projecting U-shaped resilient rake teeth 92 are secured to the flange or rim 84 of each ring 82. The teeth 92 are preferably of the type illustrated in U. S. Patent No. 2,459,961.

A peripherally toothed or notched ring element 94 is fixed to the beam 12 about each shaft 70. The ring elements 94 are located behind the rake members 72 with the toothed edges 96 of the ring elements 94 extending forwardly toward the rake members. Coil springs 98 are disposed about the shafts 70 and include forward and rear angulated ends 100 and 102. Ends 100 engage the support members 74 and the ends 102 are engaged between selected adjacent teeth of the edges 96 to yieldingly urge the rake members upwardly relative to beam 12 to partially counterbalance the weight of the rake members and retain the rake members in proper ground engaging position for the teeth 92.

Figure 7:
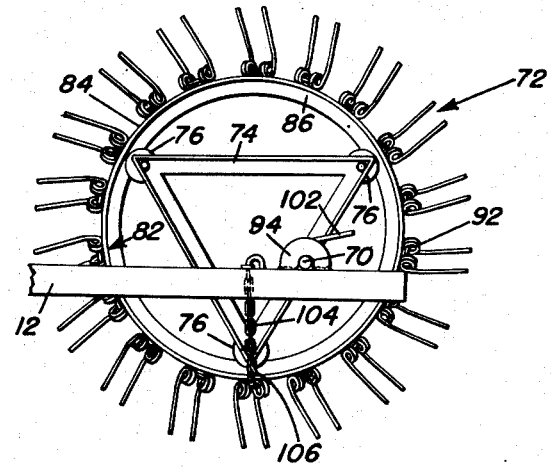
Figure 7 is a fragmentary rear elevational view of Figure 2 and showing one of the rake members locked in a raised inoperative position.
Figure 8:
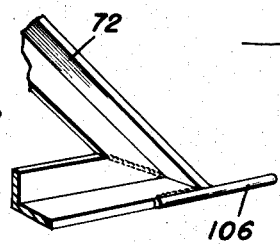
Figure 8 is a fragmentary perspective view of one of the support members used in the present invention.

Holding chains 104 are fixed at one of their ends to the beam 12 adjacent the shafts 70. The free end portions of the chains 104 are adapted to engage rods 106 fixed to the frame members 74 adjacent the shafts 48, in order to hold the rake members raised and in an inoperative position (Fig. 7) when the rotary side delivery rake is not being used.

The rake members 72 are disposed in overlapping relationship from one end of beam 12 to the other as shown in Figure 1 with the leading end of the beam 12 supporting the forwardmost of the rake members and the trailing end of beam 12 supporting the rearmost of the rake members.

In practical use of the present invention, the tractor 22 moves forwardly and the teeth of the rake members 72 will be urged by springs 98 into engagement with the ground and/or hay on the ground to impart rotation to the rings 82 as the members 74 rise or fall to conform to the contour of the ground. The hay will be picked up by the leading rake member and conducted to the next rake member and so on down the gang of rake members so that a single swath will be deposited behind the tractor 22.

To increase or decrease the row raked by the device, the shaft 48 of direction wheel 56 is rotated to move the trailing end of beam 12 closer to or farther from the rear end of the tractor, this operation changing the angle at which beam 12 is disposed to the direction of travel of the tractor. The springs 98 may be adjusted by placing the end portions 102 in selected notches of ring elements 94 to increase or decrease the downward force acting on the members 72.

What is claimed as new is as follows:

1. A side delivery rake comprising an elongated beam, a plurality of longitudinally spaced open triangular support members, horizontal shafts journaled eccentrically to the support members and fixedly supported on the beam, a ring rotatably supported on each support member, outwardly projecting rake teeth fixed to each ring, and means acting on said shafts to yieldingly urge the support members and the rings away from the ground over which the rake is moving to counterbalance the weights of the support members and the rings and facilitate the following of the contour of the ground by the rake teeth, said rings being disposed in overlapping relationship from one end of the beam to the other.

2. A side delivery rake comprising an elongated beam, a plurality of longitudinally spaced open triangular support members, horizontal shafts journaled eccentrically to the support members and fixedly supported on the beam, a ring rotatably supported on each support member, outwardly projecting rake teeth fixed to each ring, and means acting on said shafts to yieldingly urged the support members and the rings away from the ground over which the rake is moving to counterbalance the weights of the support members and the rings and facilitate the following of the contour of the ground by the rake teeth, said support members being isosceles triangular, a roller carried by each corner of each support member, said rollers having peripheral grooves, said rings being T-shaped in cross-section and each having a continuous flange, said flanges being received in said grooves, said rings being disposed in overlapping relationship from one end of the beam to the other.

3. A side delivery rake comprising an elongated beam, a plurality of longitudinally spaced open triangular support members, horizontal shafts journaled eccentrically to the support members and fixedly supported on the beam, a ring rotatably supported on each support member, outwardly projecting rake teeth fixed to each ring, a plurality of toothed ring elements fixed to the beam and concentric with said shafts, a coil spring on each shaft and having angulated ends, one end of each spring being engaged with the support members and the other ends of said springs being selectively engaged with the teeth of said ring elements to yieldingly urge the support members and the rings upwardly relative to the beam, said rings being disposed in overlapping relationship from one end of the beam to the other.

4. A side delivery rake comprising a draft frame including an elongated wheel supported beam, a plurality of longitudinally spaced vertically disposed isosceles triangular support members, a horizontal shaft journaled eccentrically on each support member and fixed to said beam, rollers carried by the corners of said support members, a ring carried by each support member and engaging the rollers of the support member it is carried by, outwardly projecting rake teeth secured to each ring, said rings being disposed in overlapping relationship from one end of the beam to the other whereby hay may be conveyed by the teeth of one ring to an adjacent ring from one end of the beam to the other, and spring means engaging the support members to yieldingly urge the support members and the rings upwardly relative to the beam.

5. A side delivery rake comprising a draft frame including an elongated wheel supported beam, a plurality of longitudinally spaced vertically disposed isosceles triangular support members, a horizontal shaft journaled eccentrically on each support member and fixed to said beam, rollers carried by the corners of said support members, a ring carried by each support member and engaging the rollers of the support member it is carried by, outwardly projecting rake teeth secured to each ring, said rings being disposed in overlapping relationship from one end of the beam to the other whereby hay may be conveyed by the teeth of one ring to an adjacent ring from one end of the beam to the other, and spring means engaging the support members to yieldingly urge the support members and the rings upwardly relative to the beam, wheel mounts at the ends of the beam one of which includes a vertically disposed wheel holding shaft and means for locking the shaft in a selected rotated position whereby the beam may be retained at a selected inclined position to a vehicle towing the draft frame.

6. A side delivery rake comprising a draft frame including an elongated wheel supported beam, a plurality of longitudinally spaced vertically disposed isosceles triangular support members, a horizontal shaft journaled eccentrically on each support member and fixed to said beam, rollers carried by the corners of said support members, a ring carried by each support member and engaging the rollers of the support member it is carried by, outwardly projecting rake teeth secured to each ring, said rings being disposed in overlapping relationship from one end of the beam to the other whereby hay may be conveyed by the teeth of one ring to an adjacent ring from one end of the beam to the other, said support members each having a corner disposed remote from the shaft supporting the member, and adjustable spring means engaging the members to yieldingly urge said corner of each member upwardly relative to the beam.

7. A side delivery rake comprising a draft frame including an elongated wheel supported beam, a plurality of longitudinally spaced vertically disposed isosceles triangular support members, a horizontal shaft journaled eccentrically on each support member and fixed to said beam, rollers carried by the corners of said support members, a ring carried by each support member and engaging the rollers of the support member it is carried by, outwardly projecting rake teeth secured to each ring, said rings being disposed in overlapping relationship from one end of the beam to the other whereby hay may be conveyed by the teeth of one ring to an adjacent ring from one end of the beam to the other, a plurality of peripherally notched ring elements fixed to said beam concentrically about said shafts and behind the members, a coil spring about each shaft having forward and rear angulated ends, the forward ends of said springs engaging the support members and the rear ends of said springs being selectively engaged with notches of said ring elements.

References Cited in the file of this patent

UNITED STATES PATENTS

| Number | Name | Date |
|---|---|---|
| 2,635,411 | Hicks | Apr. 21, 1953 |

FOREIGN PATENTS

| Number | Country | Date |
|---|---|---|
| 5,693 | Great Britain | 1908 |